No. 897,593. PATENTED SEPT. 1, 1908.
J. W. COX.
APPARATUS FOR CONTROLLING THE FLOW OF LIQUIDS.
APPLICATION FILED JUNE 8, 1908.
3 SHEETS—SHEET 1.
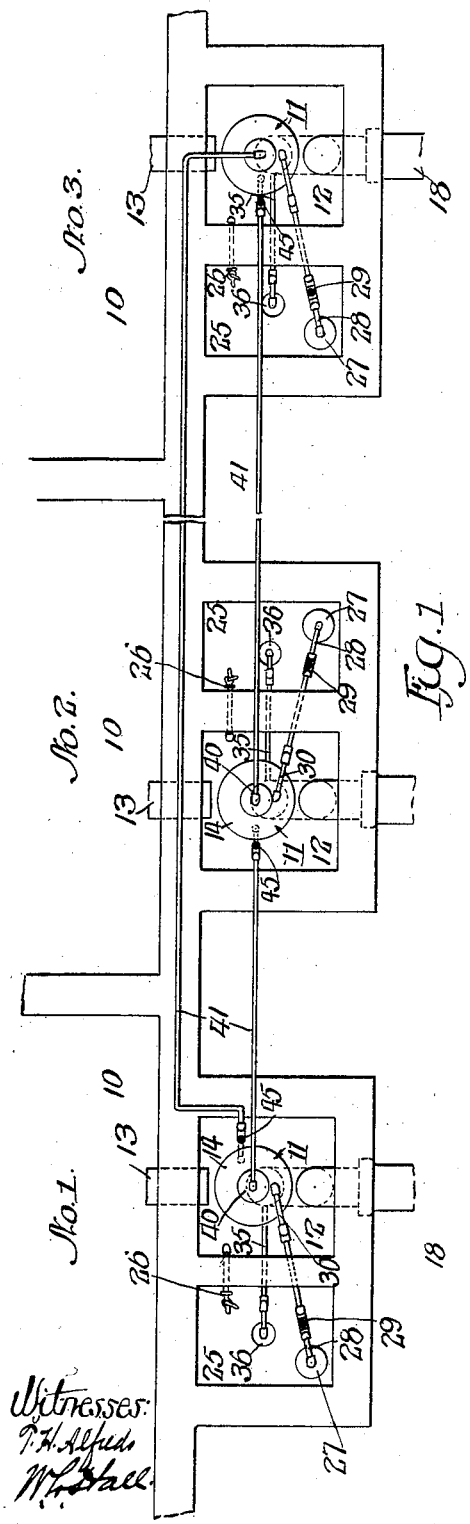
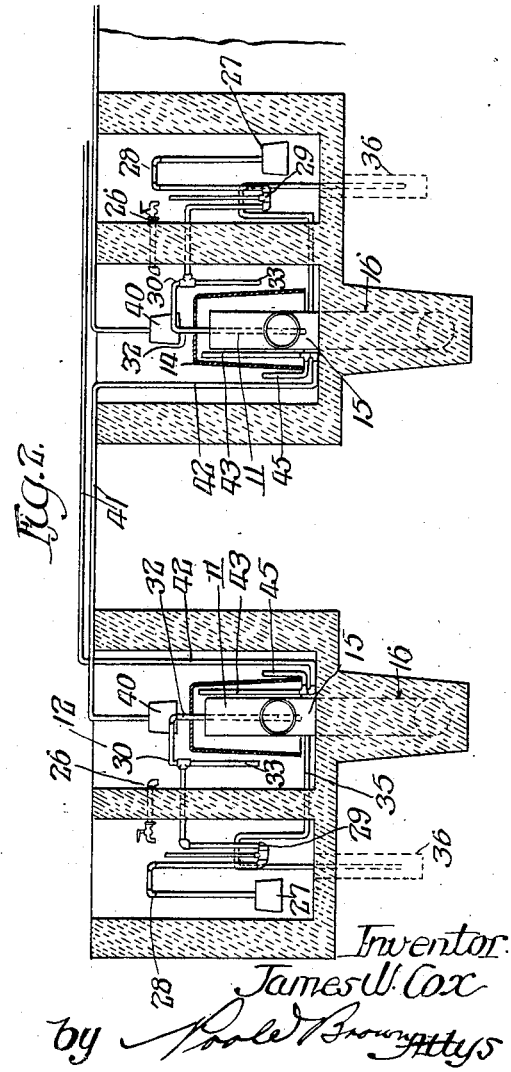

No. 897,593. PATENTED SEPT. 1, 1908.
J. W. COX.
APPARATUS FOR CONTROLLING THE FLOW OF LIQUIDS.
APPLICATION FILED JUNE 8, 1908.

3 SHEETS—SHEET 2.

Witnesses:

Inventor
James W. Cox
by Poole & Brown
Attys

No. 897,593.  
PATENTED SEPT. 1, 1908.  
J. W. COX.  
APPARATUS FOR CONTROLLING THE FLOW OF LIQUIDS.  
APPLICATION FILED JUNE 8, 1908.  
3 SHEETS—SHEET 3.

Witnesses:  
Inventor  
James W. Cox  
by Poole & Brown  
Attys

UNITED STATES PATENT OFFICE.

JAMES W. COX, OF BERWYN, ILLINOIS, ASSIGNOR TO SIDNEY W. MILLER, OF CHICAGO, ILLINOIS.

APPARATUS FOR CONTROLLING THE FLOW OF LIQUIDS.

No. 897,593.  Specification of Letters Patent.  Patented Sept. 1, 1908.

Application filed June 8, 1908. Serial No. 437,318.

*To all whom it may concern:*

Be it known that I, JAMES W. COX, a citizen of the United States, and a resident of Berwyn, in the county of Cook and State of Illinois, have invented certain new and useful Improvements in Apparatus for Controlling the Flow of Liquid; and I do hereby declare that the following is a full, clear, and exact description thereof, reference being had to the accompanying drawings, and to the letters of reference marked thereon, which form a part of this specification.

This invention relates to improvements in means for controlling the flow of liquid from tanks or receptacles in a manner to arrest the flow at a predetermined time in such a way as to insure a complete withdrawal of liquid from a receptacle where the final feed flow is slow, or to accurately measure the volume of liquid discharged into a receptacle, regardless of the rate of flow into the receptacle from which the fluid is withdrawn, and the invention relates also to a novel vent device for siphons designed for discharging the liquid contents of receptacles.

My improvements are adaptable for use in sewage purifying systems, either for controlling the flow of sewage from contact beds or for discharging liquid sewage upon the contact beds, and I have herein shown said improvements as adapted to both of the above suggested uses. It will be understood that the essential features of the invention are adaptable to other uses to control the flow of liquid either from or to tanks or receptacles.

Figure 4:
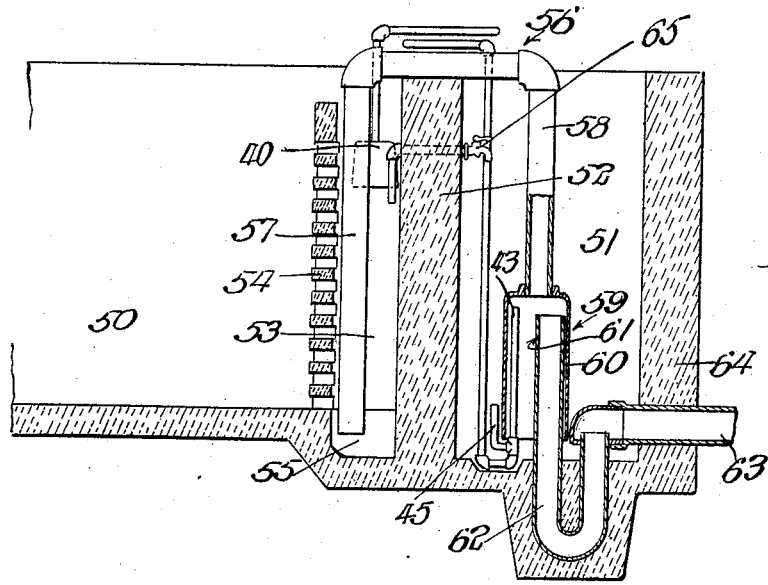
Figure 5:
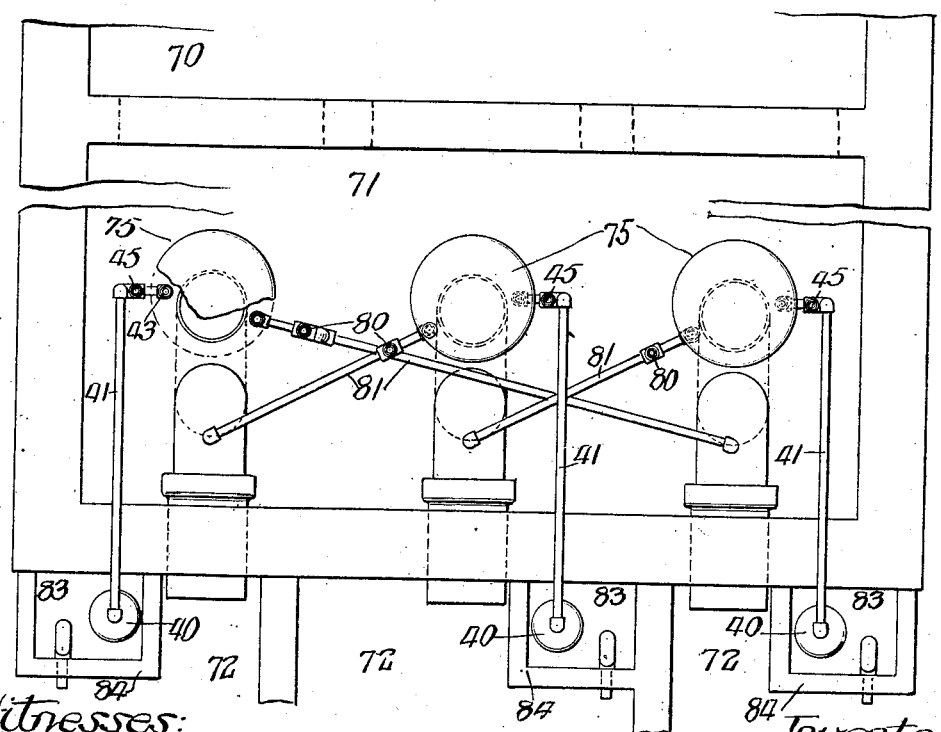
Figure 6:
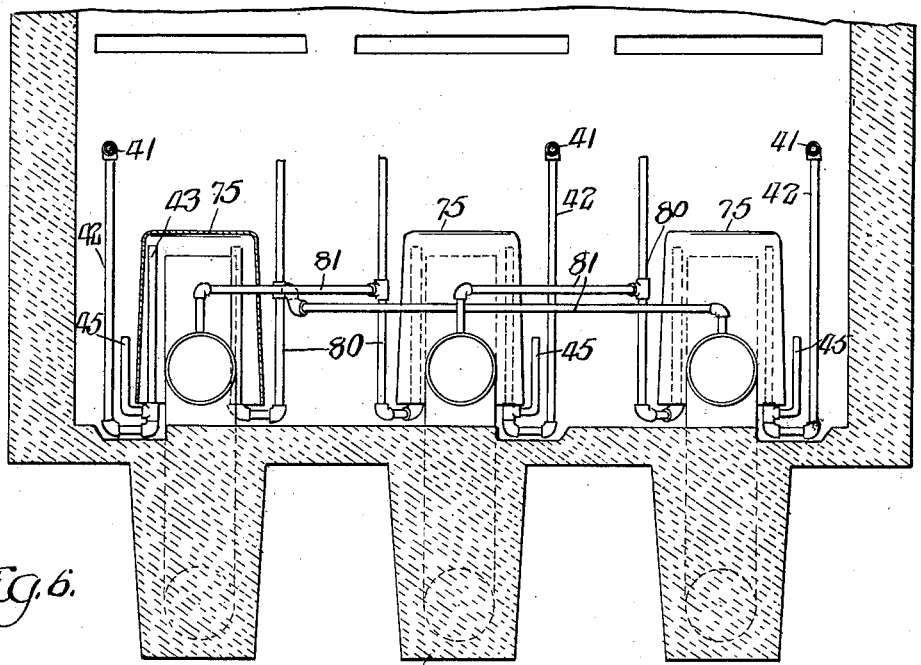
Figure 7:
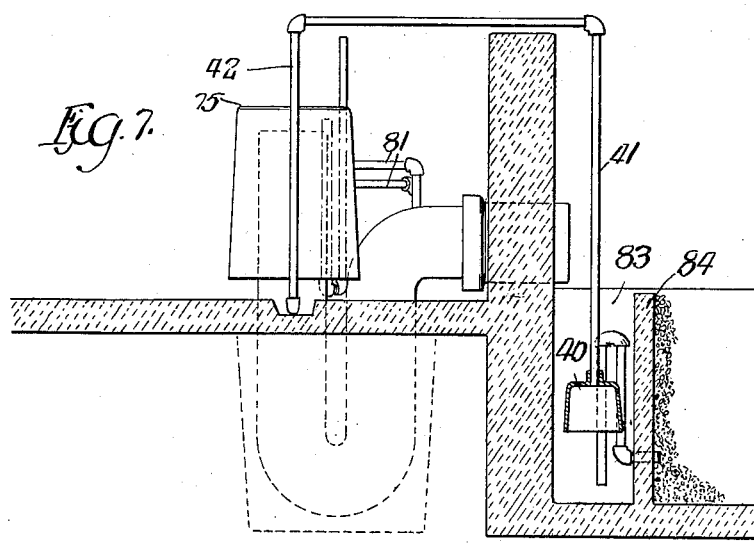

As shown in the drawings:—Figure 1 is a top plan view of the discharge end of adjacent contact beds, showing my improved apparatus for discharging the contents thereof. Fig. 2 is a partial transverse vertical section thereof. Fig. 3 is a vertical section of one of the siphons shown in Figs. 1 and 2 taken in the plane of the axis of the outlet pipe thereof. Fig. 4 is a vertical section of another form discharging apparatus in which my improvements are embodied. Fig. 5 is a top plan view of a portion of a septic or settling tank, a distributing chamber and a portion of a plurality of adjacent contact beds, showing my improved apparatus applied to distribute sewage that flows from the septic or settling tank alternately to the contact beds. Fig. 6 is a vertical section thereof showing the emptying devices partially in section and partially in elevation. Fig. 7 is a view illustrating in side elevation the emptying device and the controlling mechanism therefor.

The apparatus shown in Figs. 2 and 3 is generally like the apparatus illustrated in the prior U. S. patent to Miller No. 867,669, and is adapted for emptying sewage from the contact beds of a sewage purifying system. The apparatus in this use is so designed that the emptying operation of the emptying devices (siphons as herein shown) is so prolonged after each contact bed has been substantially emptied as to permit the sewage which does not at once find its way to emptying device to be discharged from the contact bed during the prolonged operation thereof; and the controlling apparatus for the emptying device of each contact bed is so related to the rise and fall of the liquid sewage that the emptying operation of each device is terminated before the bed, with which said device is associated, is again filled.

First referring to the construction shown in Figs. 1 and 2, 10, 10, 10 designate a plurality of contact beds, which are further distinguished by being designated as beds Nos. 1, 2 and 3. The emptying devices therefor consist of a plurality of deep trap siphons 11, 11, 11 which are contained within chambers 12 located at the discharge ends of the contact beds. Said chambers 12 are filled from the contact beds through pipes 13 located at or below the floor level of the contact beds. Each siphon comprises an intake limb 14, consisting of an inverted bell shaped receptacle, a discharge limb 15 and a deep seal trap 16, the outlet end of which discharges into a pipe 18 which leads to any desired point for the disposal of the sewage. The invert of the outlet pipe 18 is located substantially at the level or above the level of the receiving end of the intake limb of the siphon, thus preventing the siphon automatically venting itself when the contact bed is substantially emptied.

Associated with the discharging siphons are timing apparatus made generally like the construction illustrated in the prior patent to Miller No. 727,991. Each timing apparatus embraces a chamber 25 located at one side of and adapted to be filled from the associated siphon chamber 12 through a valved pipe 26 extending through the partition wall dividing said chambers. Within said timing chamber is located a downwardly opening bell 27 which has communication through a pipe 28 with an auxiliary or blow-off trap 29 that is connected with the air space of the siphon through a pipe 30, which latter extends through the partition wall dividing said chambers. The communication of said pipe 30 with the siphon is had through a pipe 32 which extends downwardly through the bell 14 and into the outlet limb of the siphon. The trap 29 affords a seal between the bell 27 and the siphon and is forced in the same manner as described in the aforesaid patent No. 727,991 by pressure due to the liquid head in the timing chamber to vent the siphon and set it in operation. The trap 29 is refilled during each operation of its associated siphon 11 through a pipe 33 which extends downwardly into the siphon chamber from the pipe 30 which connects the trap 29 with the siphon. The timing chamber 25 is emptied through the medium of a draw-off pipe 35 which extends through the partition wall between said chambers and communicates at one end with the outlet leg of the siphon 11 and is submerged at its other end in a well or sump 36 in the floor of the timing chamber.

The apparatus shown for venting the siphons at predetermined periods, and thus stopping the flow of liquid therethrough is generally like that shown on the said Miller patent No. 867,669, and is made as follows: 40, 40 designate downwardly opening bells located, as herein shown, in the siphon chambers 12, and each bell is connected by a pressure transmitting pipe 41 with the interior of another siphon of the series. The end 42 of each pressure transmitting pipe 41 remote from its bell 40 extends downwardly toward the bottom of the chamber of the siphon with which it communicates and the terminal 43 of said pipe extends upwardly into the bell or receiving limb of the siphon, said terminal extending substantially to the top of said limb, as herein shown. The vertical terminal member 43 of each pressure transmitting pipe is provided, below the level of the intake limb of the associated siphon, with a vent pipe 45 which extends laterally outwardly therefrom and thence a short distance upwardly alongside the bell. It is through this pipe 45 that the siphon is vented when air under pressure is transmitted to the siphon to arrest the flow of liquid therethrough.

In the operation of the apparatus, when each siphon chamber 12 is being filled, concurrently with the filling of the associated contact bed, the siphon is sealed at a time when the level of the liquid reaches the upper ends of the vent pipe 45, the liquid entering said vent pipe at this time and trapping the same. Thereafter the liquid rises in the siphon chamber until it reaches the level of the pipe 26, whereupon the liquid flows into the timing chamber at a rate determined by the adjustment of the valve of said pipe 26. Through the medium of the timing apparatus the air is released from the siphon at the proper time to start the siphon into operation to empty its associated contact bed in the same manner as described in said patent to Miller No. 867,669. The siphon continues in operation so long as liquid is presented thereto and until the contact bed is fully emptied and remains in condition to discharge liquid therethrough until vented by the special venting device provided therefor. When the liquid rises in one of the siphon chambers, tank or other receptacle around the bell 40 which is connected by its pressure transmitting pipe with the vent pipe of the unvented siphon just referred to, air is transmitted under pressure through said bell and its pipe 41 to the terminal member of said pipe. Said siphon may be still operating to carry the dribble away from the bed, or it may be standing filled with liquid, but not vented. At this time liquid is standing in said vent pipe 45 and in the parallel members 42 and 43 of said air transmitting pipe thus sealing the vent pipe. The air pressure thus transmitted through the pipe 41 depresses the liquid in the downwardly extending vertical member 42 of the pressure transmitting pipe and forces said liquid upwardly into the lower end of the vertical terminal member 43. As soon as the liquid rises in said terminal member 43 of said pipe above the level of the liquid in the tank 12, the liquid is drawn by the siphon action out of the pipe 43 and vent pipe, thus draining the vent pipe 45 and permitting air to pass through said vent pipe and the terminal member 43 into the interior of the siphon to vent the same. The reason that the liquid passes upwardly through the terminal member 43 of said pressure transmitting pipe rather than outwardly through the vent pipe 45 is that the upper end of said terminal member is subject to the lower pressure within the siphon and is the path of less resistance, relatively to the vent pipe, in which is contained a column of liquid that must be lifted to permit the moving column of liquid to escape therethrough.

An advantage of the construction described is that the siphons may be vented by the transmission of less volumes of air through the pressure transmitting pipes than in constructions where sufficient air would need to be forced into the siphons to overcome the partial vacuum therein before the pressure thereof becomes available to vent the siphons. In the present instance, the transfer of the liquid necessary to vent the siphons requires transmission of relatively small volumes of air. Thus the pressure transmitting bells 40 may be made of relatively small dimensions, and the head required to transmit the pressure therethrough is so small as to make it practical to locate said bells within the upper parts of the siphon chambers 12, instead of providing a special chamber within which to locate said bells. Furthermore, the arrangement herein shown provides a simple, efficient and inexpensive venting device and avoids the necessity of employing other or additional forms of vent devices such as have heretofore been used with siphons of this type.

In Fig. 4 I have shown my improvements as applied to an overhead siphon device for emptying contact beds or other receptacles, wherein the liquid is drawn from a point near the bottom of the bed or receptacle over or through one of the inclosing walls thereof. The said overhead siphon is combined with a deep trap siphon of the general type shown in the previously described figures. As shown in said Fig. 4, 50 designates a contact bed and 51 a chamber which is separated from said contact bed by a partition wall 52. Said contact bed is provided at its discharge end with a chamber 53 which is partially inclosed by a reticulated wall 54 through which liquid passes from the contact bed to said chamber. In the bottom of the chamber 53 is formed a sump or well 55 in which is maintained a body of liquid. 56 designates, as a whole, the overhead siphon, the intake limb 57 of which is located within said chamber 53 and the outlet limb 58 of which is located within the siphon chamber 51. The said receiving end of said intake limb of the overhead siphon is sealed by the liquid in said sump, and said intake limb is connected with the outlet limb by a transverse portion which extends over or through the partition wall 52. The emptying siphon 59 located within the chamber 51 is made generally like the siphon illustrated in the figures previously described, except as to its proportions. It comprises an intake limb 60, consisting of a downwardly opening bell, an outlet limb 61 and a deep seal trap 62 through which the siphon discharges, the trap itself discharging into an outlet pipe 63 leading through the wall 64 of the siphon chamber to any suitable point for the disposal of the liquid. The outlet limb of the overhead siphon discharges into the upper end of the bell or receiving limb 60 of the emptying siphon. The siphon chamber 51 is filled from the chamber 53 of the contact bed through a valved pipe 65 which extends through the partition wall 52. In the operation of this apparatus the liquid in the contact bed and chamber 53 rises to the level of the pipe 65 before any of the liquid is diverted into the siphon chamber 51. Thereafter the liquid flows slowly through said pipe and fills said siphon chamber to the level required to furnish a head to set the emptying siphon into operation. When said emptying siphon is set into operation it acts to draw the liquid from the siphon chamber 51 and also, through the overhead siphon 56, to draw the liquid from the contact bed. The intake limb of the overhead siphon is permanently sealed by the liquid in the sump or well 55 so as to prevent the emptying siphon from venting through the said overhead siphon. In this construction, as in the construction previously described, the relation of the outlet end of the trap of the emptying siphon is such, with respect to the venting level of said siphon, that the emptying siphon does not automatically vent itself; but said siphon is vented to arrest the flow of liquid therethrough by a pressure transmitting apparatus of the general character before described. Said pressure transmitting apparatus comprises the downwardly opening bells 40, which may be located in the chambers 53 of the contact beds, and pressure transmitting pipes 41, the terminals 43 of which extend upwardly into the intake limbs of the emptying siphons, and are provided beneath the level of the receiving ends of the intake limbs of said siphons with vent pipes 45, as before described. It will be understood, of course, that the contact bed 50 here shown is one of a number of such beds located side by side, as shown in Figs. 1 and 2, and that the operation of each emptying siphon is terminated by pressure transmitted thereto through the rise of liquid in another contact bed. Said pressure transmitting apparatus operates in this form of apparatus in exactly the same manner as in the form of siphon illustrated in Figs. 1, 2 and 3.

In Figs. 5, 6 and 7 I have shown my improvements as applied to siphon devices arranged to alternately feed or distribute sewage, as it comes from a septic or settling tank, to one or a number of contact beds, the apparatus being designed in this instance to control the action of the siphons by the rise of the liquid in the contact bed or beds which the siphon or siphons feed, and thus insure a predetermined charge of sewage upon the contact bed or beds, regardless of the variation of the flow thereof to or from the septic or settling tank. I have herein shown a number of siphons for feeding liquid to a number of contact beds. As shown in said figures, the said feeding siphons are located in a distributing chamber, between the septic or settling tank and the contact beds, which chamber is made of a capacity less than that of either of the contact beds. The arrangement of the feeding siphons is such that they operate in a predetermined rotatative order to alternately discharge the contents of said distributing chamber into said contact beds. The particular arrangement of the alternating feeding siphons shown is like that illustrated in the prior U. S. patent to Miller No. 847,592. In the adaptation of my improvements to this arrangement of feeding siphons, the distributing tank is made of less capacity than the contact beds and the siphons do not automatically vent themselves, being in this particular like the constructions hereinbefore described. Each siphon, therefore, continues to operate after the distributing chamber is substantially emptied, to deliver liquid which is generally flowing constantly from the septic or settling tank to the distributing chamber at a rate slower than the feed flow from the distributing chamber through the siphons. Each siphon is vented by pressure transmitted to it through the rise of liquid in the bed which the siphon feeds. Thus it will be observed that the dose or charge of liquid fed to each contact bed is equal to the contents of the distributing chamber plus the volume of liquid which flows through said chamber and the operating siphon up to the time the siphon is vented. In this manner I am enabled to accurately determine the charge or dose of liquid which is discharged upon a contact bed in each operation of the feed device, regardless of the variable quantity of liquid which may be flowing into the septic tank or other tank from which the liquid is being drawn. As shown in said figures, 70 designates a septic or settling tank, 71 a distributing chamber and 72 a plurality of contact beds in which liquid is fed from said distributing chamber through the medium of a plurality of siphons 75 which are arranged to operate in rotative order in the manner described in the said patent to Miller No. 847,592. That is to say, said siphons are each provided with an auxiliary blow-off trap 80, and the blow-off trap of each siphon is connected by a liquid diverting pipe 81 with the trap of another siphon, so that during the operation of each siphon liquid is diverted from the operating siphon to the trap of one of the non-operating siphons to strengthen its seal relatively to the other non-operating siphon, whereby the latter siphon is next brought into operation to feed the contents of the distributing chamber to one of the contact beds. It will, of course, be understood that other forms and arrangements of alternating feeding siphons may be employed.

The means for arresting the flow of liquid through each siphon, controlled by the rise of liquid in the contact bed or other receptacle into which said siphon discharges, are made as follows: Each of said contact beds may be provided with a pressure chamber 83 which is separated from its associated contact bed by a wall 84, over which wall the liquid flows from the contact bed when the latter is filled. Located within each of said chambers 83 is one of the downwardly opening pressure transmitting bells 40 which is connected by a pipe 41 with the siphon which feeds the associated contact bed. The upwardly directed terminal 43 of said pressure transmitting pipe is shown as extending upwardly into the intake limb of the siphon in the same manner as in the constructions heretofore described, and the vent pipes 45 are connected with said upwardly directed terminals of the pressure transmitting device as in the construction heretofore described. Instead of locating the pressure transmitting bells 40 in the chambers 83 of the contact beds, they may be in some instances located in the contact beds themselves.

In the operation of the apparatus last described, the liquid contents of the distributing chamber is fed through one of the siphons to one of the contact beds and the feed flow through said siphon is prolonged after the distributing chamber is substantially emptied, because of the fact that the siphon does not automatically vent itself, and because also liquid is usually presented to the siphon by reason of the continuous flow of liquid from the septic or settling tank to the distributing chamber. Such prolonged flow continues until the contact bed is filled to a predetermined level, whereupon the liquid overflows from the contact bed to the pressure chamber 83, if the latter be provided, and rises therein around the pressure transmitting bells 40. The rise of liquid about said bell forces the air entrapped in the bell through the pressure transmitting pipe 41 to the siphon and terminates the operation thereof. During the operation of the siphon just referred to liquid is diverted therefrom to one of the idle siphons to strengthen the seal thereof relatively to the other idle siphon so that the latter siphon is next brought into operation when the distributing chamber is again filled. With this construction it will be obvious that the charge of liquid delivered to each contact bed may be exactly predetermined, regardless of the rate of flow of liquid to the distributing chamber or septic tank. In some instances the feed siphons may be located in the septic or settling tank itself. The location of said siphons in a distributing chamber, however, which receives an overflow from the septic or settling tank, and which overflow is relatively more free from solids than the liquid in the tank itself, makes it desirable in most instances to locate the feed siphons within the distributing chamber.

In all the constructions described, the pipes 43 constitute part of the vent device for each siphon, the air passing into the siphon through the pipes 45 and 43 immediately after the liquid has been withdrawn upwardly therefrom into the siphon, in the manner stated. The said terminal pipes need not necessarily extend to the tops of the intake limbs of the siphons, but the extension of said pipes provides a freer path for the venting air than if said pipes terminated near the receiving ends of the intake limbs of the siphons. The pipes 45 and 43 constitute, therefore, a sealed vent device the seal of which is forced by the air pressure transmitted thereto and the liquid which seals the same is drawn into the siphons by reason of the low pressure therein. While I have shown the vent pipes as communicating directly with the intake limbs of the siphons, said vent pipes may otherwise communicate with the siphons with the same results. I do not wish to be limited, therefore, to this or other structural details shown, except as hereinafter made the subject of specific claims.

I claim as my invention:—

1. Means for emptying the liquid contents of a tank comprising a siphon, means whereby the emptying operation of the siphon is automatically prolonged after the contents of the tank have been substantially discharged, and means operating at a predetermined period thereafter to discontinue the operation of the siphon, embracing a sealed vent pipe which enters the siphon and means for transmitting air under pressure to said vent pipe, for the purpose set forth.

2. Means for emptying the liquid contents of a tank comprising a trapped siphon apparatus, the trap of which is so proportioned relatively to the intake limb of the siphon apparatus that the siphon does not automatically vent itself, and means for terminating the emptying operation of the siphon embracing a sealed vent pipe which enters the siphon apparatus and means for transmitting air under pressure to said vent pipe, for the purpose set forth.

3. Means for emptying the liquid contents of a tank comprising a trapped siphon apparatus, the trap of which is so proportioned relatively to the intake limb of the siphon apparatus that the siphon does not automatically vent itself, a vent pipe entering the siphon and arranged to be sealed at or below the level of the receiving end of the intake limb of the siphon apparatus, and a pressure transmitting pipe arranged to transmit air under pressure to said vent pipe.

4. Means for emptying the liquid contents of a tank comprising a trapped siphon apparatus, the trap of which is so proportioned relatively to the intake limb of the siphon that the siphon does not automatically vent itself, and a pressure transmitting pipe extending into the siphon and provided at or below the level of the receiving end of said intake limb and exterior thereto with a sealed vent pipe.

5. The combination with a siphon, of a pressure transmitting pipe extending into the siphon and a sealed vent pipe exterior to said intake limb and connected with said pressure transmitting pipe at or below the level of the receiving end of said intake limb.

6. The combination with a siphon, of a vent pipe having a part which extends into the siphon and having an exterior part which extends upwardly outside the siphon, said pipe being arranged to be liquid sealed at or below the level of the intake limb, and a pressure transmitting pipe connected with the vent pipe to force the sealing liquid upwardly through the vent pipe in the direction towards which it is urged by the lower pressure in the siphon.

7. In combination, a septic or settling tank, a distributing chamber which receives liquid therefrom, and a contact bed made of a capacity greater than that of the distributing chamber, of a deep trap siphon for distributing liquid from the distributing chamber to the contact bed, said siphon being so proportioned relatively to its trap as to prolong the feed flow to the contact bed after the distributing chamber has been substantially emptied, and means controlled by the rise of liquid in the contact bed for terminating the feeding operation of the siphon.

8. In combination, a septic or settling tank, a distributing chamber which receives liquid therefrom and a contact bed made of a capacity greater than that of the distributing chamber, a siphon arranged to feed liquid from the distributing chamber to said contact bed, means whereby the feed flow of the siphon is prolonged after the chamber has been substantially emptied, and means controlled by the rise of liquid in said contact bed for arresting the feed flow of the liquid through said siphon, comprising a downwardly opening bell in said contact bed and a pipe leading from said bell to said siphon.

9. In combination, a septic or settling tank, a distributing chamber which receives liquid therefrom and a contact bed made of a capacity greater than that of the distributing chamber, a siphon arranged to feed liquid from the distributing chamber to said contact bed, means whereby the feed flow of the siphon is prolonged after the chamber has been substantially emptied, and means controlled by the rise of liquid in said contact bed for arresting the feed flow of the liquid through said siphon, comprising a downwardly opening bell in said contact bed, a pipe leading from said bell to said siphon, and a sealed vent pipe entering said siphon and associated with said pressure transmitting pipe.

In testimony, that I claim the foregoing as my invention I affix my signature in the presence of two witnesses, this 26th day of May A. D. 1908.

JAMES W. COX.

Witnesses:
W. L. HALL,
SIDNEY W. MILLER.